United States Patent [19]

Hayashi

[11] Patent Number: 4,608,942

[45] Date of Patent: Sep. 2, 1986

[54] METHOD OF CONTINUOUSLY SPRAYING LIQUIDS ONTO LENGTHY BODIES MOVING AT HIGH SPEED

[75] Inventor: Kanji Hayashi, Tokyo, Japan

[73] Assignee: Fanetech Institute Limited, Japan

[21] Appl. No.: 733,511

[22] Filed: May 13, 1985

[30] Foreign Application Priority Data

May 12, 1984 [JP] Japan .................................. 59-95447

[51] Int. Cl.[4] .......................... B05B 1/26; B05B 15/00

[52] U.S. Cl. .................................... 118/316; 118/325; 118/326; 427/209; 427/424; 239/524

[58] Field of Search ................ 427/209, 424; 118/316, 118/325, 326; 239/500, 524, 338, 370, 343

[56] References Cited

U.S. PATENT DOCUMENTS 2,770,210 11/1956 Miller .............................. 118/316 X
2,915,252 12/1959 Umbricht et al. .................... 239/500
3,251,556 5/1966 Burnham ............................. 239/338

FOREIGN PATENT DOCUMENTS 1475183 2/1969 Fed. Rep. of Germany ...... 239/500

*Primary Examiner*—Shrive P. Beck
*Attorney, Agent, or Firm*—McGlew and Tuttle

[57] ABSTRACT

An electrostatic preventive film or silicone film is applied to the surface of elongated substrates by spraying the substance while in a liquid state, substrate while it is moving at a high speed. The surface tension of the liquid is adjusted and then the surface tension adjusted liquid substance is jet sprayed into a fine particle production chamber and at the same time applied against a vertical impingement plate installed inside the chamber for the sake of producing fine particles smaller than 10μ. The fine particles thus produced are stored inside an accumulator tank for raising its concentration to a higher level, then the highly concentrated fine particles are given kinetic energy, thus providing the method of spraying onto the surface of the moving substrate.

2 Claims, 2 Drawing Figures

METHOD OF CONTINUOUSLY SPRAYING LIQUIDS ONTO LENGTHY BODIES MOVING AT HIGH SPEED

FIELD AND BACKGROUND OF THE INVENTION

The present invention relates in general to the field of liquid spray coating, and in particular to a new and useful apparatus and method for spray coating a lengthy substrate which is moving at high speeds.

When an electrostatic preventive coated film is to be built up onto the surface of lengthy substances such as magnetic tape, it is necessary to perform this process extremely efficiently when applying it to industrial production.

A conventional technique is known where fine grain diameter mists are produced through the use of a supersonic wave oscillation device, which mists are then sprayed onto the surface of an object. This method, however, involves some problematic aspects that are given below.

(1) One oscillation device cannot produce so much volume of mists (hereinafter referred to as "fine particles"), so a number of oscillation devices must be installed for producing a great deal of fine particles that can be utilized for industrial purposes. For instance, the volume of fine particles that can be produced by a supersonic wave oscillation device is only 0.1 miter/hour on the basis of water as the liquid to be sprayed.

(2) While using a supersonic wave oscillation device, the liquid level must be controlled severely and its negligence leads to breakage of the device.

(3) The device cannot be used over a long period of time even though its costs are comparatively high.

(4) The device cannot be used with a liquid of high temperature.

(5) For the aforesaid reasons, the spraying method utilizing a supersonic wave oscillation device cannot be applied to the case where a silicone emulsion coating is to be made on the surface of a plastic film or to the case where electrostatic inhibitor water soluble liquid is to be sprayed in large volume and at industrial scale, onto the surface of magnetic tape.

SUMMARY OF THE INVENTION

The present invention is directed to a method which is capable of spraying a liquid state substance continuously onto the surface of a lengthy body moving at a high speed, using a compact device and thus building up a uniform coated film. The invention is also drawn to a device for practicing this method.

DESCRIPTION OF THE PREFERRED EMBODIMENT

As the means for achieving the aforesaid purpose, the present invention has adopted the methods of (a) adjusting the surface tension of liquid state substance (spray liquid), (b) jetting the aforesaid liquid state substance from a spray nozzle in the horizontal direction for impinging or spraying the liquid against a vertical impingement plate and of producing fine particles of diameter smaller than 10μ and turning the fine particles of diameter larger than 10μ to a drain and (c) storing once the produced fine particle in an accumulator tank for raising its concentration of particles and for giving the particles kinetic energy before spraying them onto the surface of a lengthy body.

Figure 1:
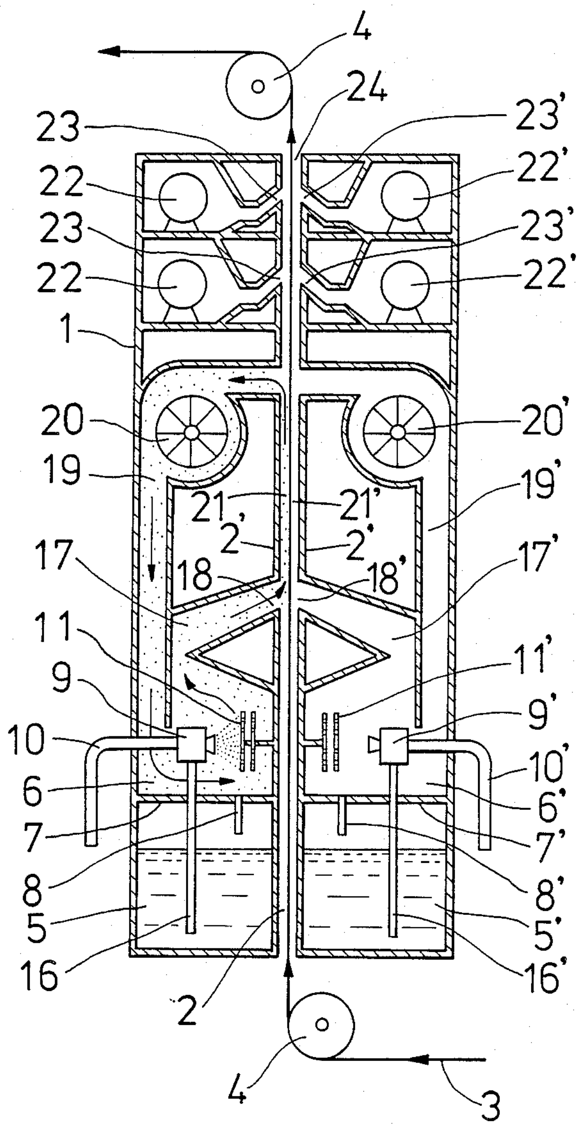
FIG. 1 illustrates the spraying device for practicing the method of this invention, in sectional view, the device being able to apply a liquid state substance on both faces of a lengthy body.

FIG. 1 shows an actual embodiment of this invention where 3 designates the surface of a lengthy body moving at a high speed on both side of which the housing 1 of the inventive device for spraying liquid state substance is attached. In the housing 1, walls 2',2' form a movement channel 2' for the lengthy body 3 formed at the center of the device housing 1. The number represents guide rollers for the lengthy body 3, 5 and 5' are spray liquid tanks built symmetrically on the internal bottom of the device, and 6 and 6' are symmetrical fine particle producing chambers formed over the spray liquid tanks 5 and 5' via partition plates 7 and 7'. Drain pipes 8 and 8' introduce liquid which has been produced inside the fine particle producing chambers 6 and 6', into the spray liquid tanks 5 and 5'. Spray nozzles 9 and 9' are attached symmetrically and horizontally within the fine particle producing chambers 6 and 6', and receive air at 3 kg/cm$^2$ through compressed air pipes 10 and 10'.

In front of spray nozzles 9 and 9' impingement plates 11 and 11' are mounted, which are laid out vertically about 10 cm from the nozzles. Plates 11 and 11' are comprised of a front plate 12 and a rear plate 13 as shown in FIG. 3 for plate 11, and are equipped with through-holes 14 and 15 so as not to allow the front plate 12 to overlap with the rear plate 13 with respect to a jet spray from nozzles 9 and 9'.

Liquid suction pipes 16 and 16' are attached between the spray nozzles and the spray liquid tanks 5 and 5', for sucking up the spray liquid by utilizing the back pressure or siphoning phenomenon due to air energy beign jetted out through the compressed air pipes 10 and 10'.

Symmetric accumulator tanks or channels 17 and 17' are formed continuously in the aforesaid fine particle producing chambers 6 and 6', and the produced fine particles are stored once within these tanks in a suspended state.

Slit shaped fine particle jet ports 18 and 18' are formed by cutting and opening the channel wall 2' of movement channel 2 and continue to the aforesaid accumulator tanks 17 and 17'. Symmetric compressed air supply channels 19 and 19' are provided for supplying compressed air into the aforesaid fine particle jet ports 18 and 18' through the fine particle producing chambers 6 and 6'. Blower fans 20 and 20' are provided for generating the compressed air within the aforesaid compressed air supply channels 19 and 19'. Fine particle adhesion chambers 21 and 21' (coating chambers) are formed within the movement channel 2. These fine particles adhesion chambers 21 and 21' as well as the compressed air supply channels 19 and 19', the fine particle producing chambers 6 and 6', the accumulator 17 and 17' and the fine particle jet ports 18 and 18' constitute together a fine particle circulation channel for flow in one one direction. Items 22 and 22' are hot air fans which have been structured symmetrically, and the heated air which is supplied from these hot air fans 22 and 22' is jetted out into a drying chamber 24 within the movement channel 2 through heated air jet ports 23 and 23' for drying up the coating liquid which has adhered to the surface of the lengthy body 3.

The device utilized for the spraying method in connection with this invention, is as explained above. Its usage is to be expounded below. Moreover, for the sake of explanation, the description is of a case for uni-lateral spraying, and the case of bilateral spraying can be considered as a symmetrical device acting on quite the same principle.

When compressed air is supplied under an air pressure of 3 $kg/cm^2$ to the spray nozzle 9 via the compressed air pipe 10, the spray liquid is sucked by kinetic energy of the compressed air from the spray liquid tank 5 via the liquid pipe 16 and sprayed into the fine particle producing chamber 6. The sprayed liquid impinges on the impingement plate 11 while the liquid larger in grain size and further in kinetic energy is liquefied after it has collided against the impingement plate 11. On the other hand, the sprayed particles which are smaller in diameter, fly away and float within the fine particle producing chamber 6, and are stored inside the accumulator tank or channel 17. This raises the concentration of fine particles in channel 17. In an actual example of the invention, more than 50% of the fine particles have a grain size smaller than 10μ which is best suited for spraying. Liquefied spray liquid which has larger grain size returns to the spray liquid tank 5 through the drain pipe 8.

Figure 2:
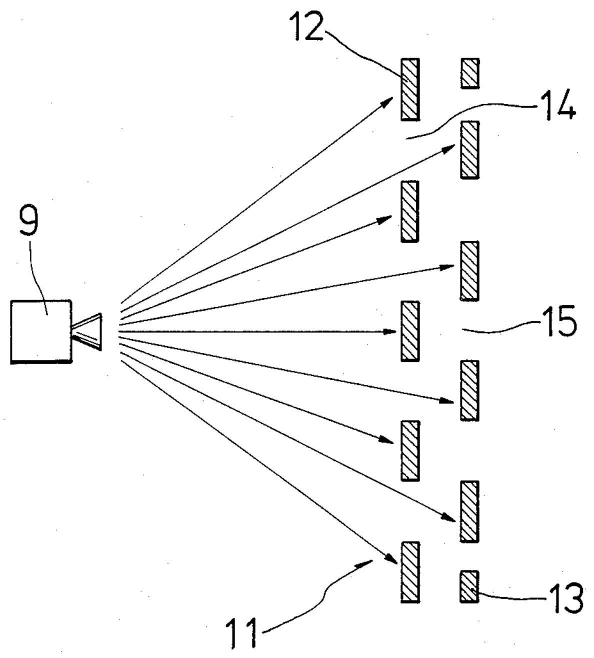
FIG. 2 shows the spray and the impingement plate where the liquid state substance being jetted from this spray is impinged thereon, in sectional view showing only the impingement plate and spray nozzle.

What's more, the impingement plate 11 has a two sheet structure as shown in FIG. 2, and with the provision of nonaligned through holes 14 and 5 on its two plates 12, 13, the fine particles smaller than 10μ fly away also via these through-holes 14 and 15. As a result the generation efficiency of the fine particles can be increased.

The fine particles once stored within the accumulator tank 17 are sprayed onto the surface of the lengthy body 3 at high speed by the compressed air being generated by blower fan 20 via the fine particle spray port 18. The spray sticks to and diffuses into a film shape due to the attenuation action of surface tension, thereby an exteremely thin film is built up on the surface of lengthy body 3. This extremely thin film face is stabilized while passing through the interior of fine particle adhesion chamber 21 and then is dried in the drying chamber 24.

Furthermore, the surface tension of spray liquid needs to be adjusted to 20 to 30 dyne/cm for producing the fine particles smaller than 10μ efficiently and moreover for forming the film face uniformly on the lengthy body.

The effects as given below can be expected by adopting the technical means as introduced above. (a) Since the fine particles are being generated by jetting the spray liquid through utilization of spray nozzle, a great deal of fine particles can be obtained. For instance, while the produced volume of fine particles when using a 50 W supersonic wave oscillation device is 0.1 liter/hour on the basis of water, it becomes from 1.0 to 2.0 liters/hour when the inventive spray system is adopted. Also, to obtain the fine particles of grain diameter smaller than 10μ in case of a spray sytem, and further to attain the recovery ratio of 50%, then the generated volume of fine particles become about 5 to 10 times in comparison to what supersonic wave system can obtain.

(b) By spraying mist into the fine particle producing chamber, the fine particles that are larger in grain diameter can be liquefied and returned back to the spray liquid tank from where it can be jetting out again against the impingement plate, while the fine particles smaller in diameter alone can be flown into the accumulator tank, and hence it is possible without difficulty to obtain the fine particles of uniform diameter and smaller diameter. For this reason, it is possible to attain the uniformly thinnest of the coated film surface.

(c) As the fine particles which have been produced by jetting out through the spray system and been adjusted to the grain diameter smaller than a certain level by means of an impingement plate is being once stored inside the accumulator tank, the fine particles can be adjusted in their concentration. Consequently, a uniformly coated film can be formed and at the same time the film thickness can be adjusted freely through the adjustment of concentration.

(d) Since the fine particles inside the accumulator tank are forcibly jetted against the lengthy body by utilizing the compressed air, a favorable adhesion of fine particles can be achieved by this kinetic energy. Especially, adhesion against the lengthy body moving at a high speed proves favorable.

(e) Because of the spray system, the temperature of fine particles can be raised by utilizing an elevated temperature spray liquid and the drying time can be shortened after the spraying process.

(f) Since the fine particles can be adhered to the lengthy body moving at a high speed and the uniform coated film can be built up thereon because of the aforesaid effects, this offers the capacity for industrial production in large quantity, for instance, for such materials as silicone coated substrates. For example, the speed in case of spraying the electrostatic inhibitor water solution onto the plastic film lengthy body of 70 cm width with use of a unit of 50 W supersonic wave oscillation device proves to be 50 m/min maximum, but the speed of 200 m/min can be achieved by using the method of this invention.

What is claimed is:

1. A device for applying a liquid substance to an elongated body comprising:

a housing having a movement channel therethrough for the passage of the elongated body;

body movement means for moving the elongated body at high speed through said movement channel in a movement direction;

said housing having at a lower end thereof at least one liquid tank for containing a supply of the liquid substance to be applied to the elongated body;

said housing defining a fine particle producing chamber above said liquid tank having an accumulator channel communicating with said movement channel;

drainage means for draining liquid from a bottom of said fine particle chamber to said liquid tank;

spray nozzle means in said fine particle chamber below said accumulator channel for spraying a mixture of liquid substance plus air in a horizontal direction in said fine particle chamber, said nozzle means being connected to a source of compressed air and being connected to said liquid tank for drawing liquid substance from the liquid tank;

vertical impingement plate means positioned in said fine particle chamber at a location spaced from said nozzle means and positioned to receive a spray from said nozzle means, said impingement plate means being shaped to break up liquid spray into fine particles; and air circulation means connected in said accumulator channel for circulating fine particles and air through said accumulator channel from said fine particle chamber to an area of said accumulator tank communicating with said movement channel, and then back to said fine particle chamber whereby a fine particle mist is deposited on the elongated body as it moves at high speed through said movement channel.

2. A device according to claim 1, wherein said movement channel includes a drying channel portion downstream of a portion of said movement channel which communicates with said accumulator channel, and air drying means connected in said housing and communicating with said drying channel portion for drying liquid substance sprayed onto the elongated body before the body leaves said housing.

* * * * *